UNITED STATES PATENT OFFICE.

WILLIAM L. VOELKER, OF ELIZABETH, NEW JERSEY, ASSIGNOR, BY MESNE ASSIGNMENTS, TO THE VOELKER LIGHT COMPANY, OF NEW JERSEY.

HOOD FOR INCANDESCENT GAS-LAMPS.

SPECIFICATION forming part of Letters Patent No. 581,894, dated May 4, 1897.

Application filed October 14, 1895. Serial No. 565,681. (No model.)

*To all whom it may concern:*

Be it known that I, WILLIAM L. VOELKER, a citizen of the United States, and a resident of the city of Elizabeth, Union county, State of New Jersey, have invented certain new and useful Improvements in Hoods or Mantles for Incandescent Gas-Lights, of which the following is a specification.

This invention relates to improvements in hoods or mantles for incandescent gas-lights of that type wherein the light is produced by the incandescence of refractory metallic oxids or salts.

More particularly it relates to the production of materials or masses suitable for such hoods by the proper combination of the cheaper oxids of the metals—as, for example, lime and magnesia—with celluloid, guncotton, or other like substance and oil of cassia or other material that is capable of dissolving the celluloid or guncotton and of rendering the mass more plastic. The mass produced from such ingredients as aforesaid, and which I term "celluoxide," is put, while plastic, into a strong vessel, a head or end of which is perforated with fine openings, forming a die. The plastic mass is forced by pressure through these openings, thereby forming tough flexible threads or filaments of incandescing material, which can be worked by any suitable weaving or braiding mechanism and joined into an interlacing hood or mantle.

The use of a liquid solvent for the celluloid or guncotton is not indispensable, but I can render the mass that results from the combination of the celluloid or similar substances and the powdered metallic oxids plastic by the aid of heat and without the use of a liquid solvent, the essential thing in the treatment of the materials being that the oxids, which, as said, are first reduced to an impalpable powder, and the carrier or body for the same—which is to say, the celluloid or guncotton—should be thoroughly intermixed.

While the material, which I term the "mass," may be produced by various equivalent methods, I will now describe that method which I prefer to use. Dissolve celluloid in alcohol or ether in the proportions, preferably, of one part of celluloid to one part of alcohol or one part of ether, by weight. The solution can be facilitated by gentle heat, as by making it over a water-bath. When the celluloid is reduced to a liquid condition, pour it over the bed of an incorporating-mill—such, for example, as is used in the manufacture of chocolate. Then over this pour the finely-powdered oxids of calcium and magnesium. These oxids should be used in the proportions of forty-five per cent. of oxids of magnesium and fifty-five per cent. of oxid of calcium, (lime,) and I have discovered that dolomite, which is the double carbonate of magnesia and calcium, can be used with advantage by first calcining and reducing it to an impalpable powder. Equal parts of powdered dolomite and of the celluloid solution, produced as aforesaid, are mixed together.

The mass which results from the perfect incorporation of the foregoing ingredients is very elastic and tenacious, resembling india-rubber, and the thread or filament which can be formed by forcing the mass through the small orifices of a die can, when dry, be manipulated in any desired way for manufacturing the hoods or mantles.

The aforesaid mass, when formed into a hood or mantle and rendered incandescent by a gas-flame or other source of heat, gives a very brilliant white light, which can be mellowed, if desired, by admixture of a very small percentage of chromium anhydrid or cerium oxid, the proportion of chromium being as one to four hundred parts of dolomite, by weight. I do not wish to restrict myself to these exact proportions or ingredients, but the best results are obtained both in manipulation and in light and life of mantle by following very closely the proportions above described, and there can be thus produced a hood or mantle that is very cheap, durable in the gas-flame, and which produces a pure steady glow that is pleasant to the eye. In place of the celluloid, however, I can use guncotton or other like substance with good results. The guncotton is dissolved in oil of cassia in the proportion of one part of each, by weight. The metallic oxids are then added to the solution and treated as before. I also note that the celluloid can be dissolved in oil of cassia in the proportion of one part of oil of cassia to one and a half parts of celluloid.

I have discovered that when a hood or mantle formed as hereinbefore described is baked or burned out over a gas-flame or by other source of heat a peculiar phenomenon takes place, which greatly adds to the efficiency of these hoods as light-giving agents. That is to say, the hoods bake or burn out in thin flat plates resembling furnace-grate bars, and I shall call the hood a "grating." These plates, when examined under a microscope, are found to be dotted over with myriads of small holes and have a strong resemblance to a coral formation. Such a hood gives a light of high candle-power, because the inner or idle part of the hood is very small compared to the part that is visible or projects its incandescence into space. In other words, if an ordinary incandescent round filament gives one-half the circumference of its surface as available light, an incandescent filament prepared as above will give three-quarters of its surface as available light.

Now, having described my improvements, I claim as my invention—

1. A material for hoods and mantles of incandescent gas-lights, consisting of celluloid dissolved in oil of cassia or alcohol as described and dolomite substantially as described.

2. A material for mantles and hoods of incandescent gas-lights, consisting of a solution of celluloid in oil of cassia, ether, or alcohol, and dolomite in the proportion of one part of celluloid solution to one part of dolomite by weight, substantially as described.

3. A hood or mantle for incandescent gas-lighting consisting of a solution of celluloid or guncotton in oil of cassia combined with dolomite, substantially as described.

In testimony that I claim the foregoing as my invention I have signed my name, in presence of two witnesses, this 9th day of August, 1895.

WILLIAM L. VOELKER.

Witnesses:
BERNARD J. ISECKE,
HENRY V. BROWN.